United States Patent
Conte et al.

(10) Patent No.: US 9,189,282 B2
(45) Date of Patent: Nov. 17, 2015

(54) THREAD-TO-CORE MAPPING BASED ON THREAD DEADLINE, THREAD DEMAND, AND HARDWARE CHARACTERISTICS DATA COLLECTED BY A PERFORMANCE COUNTER

(75) Inventors: Thomas Martin Conte, Atlanta, GA (US); Andrew Wolfe, Los Gatos, CA (US)

(73) Assignee: Empire Technology Development LLC, Wilmington, DE (US)

( * ) Notice: Subject to any disclaimer, the term of this patent is extended or adjusted under 35 U.S.C. 154(b) by 1288 days.

(21) Appl. No.: 12/427,602

(22) Filed: Apr. 21, 2009

(65) Prior Publication Data

US 2010/0268912 A1    Oct. 21, 2010

(51) Int. Cl.
| | |
|---|---|
| G06F 9/50 | (2006.01) |
| G06F 9/30 | (2006.01) |
| G06F 11/34 | (2006.01) |
| G06F 9/48 | (2006.01) |

(52) U.S. Cl.
CPC .......... *G06F 9/5044* (2013.01); *G06F 9/30101* (2013.01); *G06F 9/4856* (2013.01); *G06F 9/5027* (2013.01); *G06F 11/3409* (2013.01); G06F 2209/501 (2013.01)

(58) Field of Classification Search
CPC . G06F 9/30101; G06F 9/3836; G06F 9/3851; G06F 9/3885; G06F 9/5044; G06F 11/3409; G06F 15/7807; G06F 9/4856
USPC .................. 702/182, 186; 712/1, 22, 28, 220; 714/47.1; 718/102, 104
See application file for complete search history.

(56) References Cited

U.S. PATENT DOCUMENTS

| | | | |
|---|---|---|---|
| 5,394,548 A * | 2/1995 | Nakajima et al. ............. 718/103 |
| 5,659,721 A | 8/1997 | Shen et al. |
| 5,968,115 A | 10/1999 | Trout |
| 6,243,788 B1 | 6/2001 | Franke et al. |
| 6,434,594 B1 | 8/2002 | Wesemann |
| 7,269,713 B2 | 9/2007 | Anderson et al. |
| 7,318,125 B2 | 1/2008 | Chiang et al. |
| 7,434,002 B1 | 10/2008 | Zedlewski et al. |
| 7,437,581 B2 | 10/2008 | Grochowski et al. |

(Continued)

FOREIGN PATENT DOCUMENTS

| | | |
|---|---|---|
| JP | 2000148518 | 5/2000 |
| JP | 2003006175 A | 1/2003 |

(Continued)

OTHER PUBLICATIONS

Becchi, M. et al., "Dynamic Thread Assignment on Heterogeneous Multiprocessor Architectures", ACM, May 3-5, 2006, pp. 29-39.

(Continued)

*Primary Examiner* — David J Huisman
(74) *Attorney, Agent, or Firm* — Moritt Hock & Hamroff LLP; Steven S. Rubin, Esq.

(57) ABSTRACT

Techniques for thread mapping in multi-core processors are disclosed. An example computing system is disclosed having a multi-core processor with a plurality of processor cores. A performance counter may be configured to collect data relating to the performance of the multi-core processor. A core controller may be configured to map threads of execution to the processor cores based at least in part on the data collected by the performance counter.

11 Claims, 8 Drawing Sheets

(56) References Cited

U.S. PATENT DOCUMENTS

| | | | |
|---|---|---|---|
| 7,461,376 B2 * | 12/2008 | Geye et al. | 718/100 |
| 7,526,661 B2 * | 4/2009 | Nakajima et al. | 713/320 |
| 7,614,056 B1 * | 11/2009 | Saxe et al. | 718/105 |
| 7,890,298 B2 | 2/2011 | Coskun et al. | |
| 7,930,574 B2 * | 4/2011 | Cai et al. | 713/322 |
| 8,468,532 B2 * | 6/2013 | Aguilar et al. | 718/103 |
| 2003/0163648 A1 | 8/2003 | Smith | |
| 2004/0215987 A1 | 10/2004 | Farkas et al. | |
| 2005/0021931 A1 | 1/2005 | Anderson et al. | |
| 2005/0039185 A1 | 2/2005 | Heidari-Bateni et al. | |
| 2005/0086660 A1 | 4/2005 | Accapadi et al. | |
| 2005/0216775 A1 * | 9/2005 | Inoue | 713/300 |
| 2005/0235126 A1 | 10/2005 | Ko et al. | |
| 2006/0037017 A1 | 2/2006 | Accapadi et al. | |
| 2006/0168571 A1 | 7/2006 | Ghiasi et al. | |
| 2007/0033592 A1 | 2/2007 | Roediger et al. | |
| 2007/0050605 A1 | 3/2007 | Ferren et al. | |
| 2007/0074011 A1 | 3/2007 | Borkar et al. | |
| 2007/0283358 A1 | 12/2007 | Kasahara et al. | |
| 2007/0294693 A1 * | 12/2007 | Barham | 718/102 |
| 2008/0244226 A1 | 10/2008 | Li | |
| 2008/0250414 A1 | 10/2008 | Brokenshire et al. | |
| 2009/0037911 A1 | 2/2009 | Ahuja et al. | |
| 2009/0089792 A1 | 4/2009 | Johnson et al. | |
| 2009/0217277 A1 | 8/2009 | Johnson et al. | |
| 2010/0005474 A1 | 1/2010 | Sprangle et al. | |
| 2010/0077185 A1 * | 3/2010 | Gopalan et al. | 712/220 |
| 2010/0268912 A1 | 10/2010 | Conte et al. | |
| 2010/0332883 A1 | 12/2010 | Saxe et al. | |

FOREIGN PATENT DOCUMENTS

| | | | |
|---|---|---|---|
| JP | 2004220608 A | 8/2004 | |
| JP | 2004326175 A | 11/2004 | |
| JP | 2005031771 | 3/2005 | |
| JP | 2006028323 A | 2/2006 | |
| JP | 2006235907 A | 9/2006 | |
| JP | 2007021045 A | 2/2007 | |
| JP | 2007108944 A | 4/2007 | |
| JP | 2007226587 A | 9/2007 | |
| JP | 2007328415 A | 12/2007 | |
| JP | 2008090546 A | 4/2008 | |
| JP | 2008123205 A | 5/2008 | |
| JP | 2010207850 A | 9/2010 | |
| JP | 2011031134 A | 2/2011 | |

OTHER PUBLICATIONS

Chen, T. et al., "A Location-Based Mobile Game Engine on the Heterogeneous Multi-Core Processor Architecture", Journal of Computational Information Systems 1:2, Jun. 2005, pp. 1-7.

Constantinou, T. et al., "Performance Implications of Single Thread Migration on a Chip Multi-Core", ACM SIGARSch Computer Architecture News, vol. 33, No. 4, Sep. 2005, pp. 80-91.

Kumar, R. et al., "Single-ISA Heterogeneous Multi-Core Architectures for Multithreaded Workload Performance", Proceedings. 31st Annual International Symposium on Computer Architecture, Jun. 19-23, 2004, IEEE, pp. 64-75.

Kumar, R., et al., "Processor Power Reduction via Single ISA Heterogenous Multi-Core Architectures," Computer Architecture Letters, 2003, pp. 4, vol. 2, Issue 1.

European Search Report for corresponding European application with application No. EP 10 15 4703, dated Apr. 16, 2010, 11 pages.

Bloom, B.H., "Bloom Filter," accessed at www.en.wikipedia.org/wiki/Bloom_filter, last modified on May 18, 2013, 13 Pages, date retreived May 20, 2013.

International Search Report and Written Opinion for International Patent Application No. PCT/US10/37498 mailed Sep. 20, 2010, p. 4-5, & 7.

International Search Report for International Patent Application No. PCT/US10/37496 mailed Sep. 21, 2010, p. 2.

International Search Report and Written Opinion for International Patent Application No. PCT/US10/37489 mailed Sep. 20, 2010, p. 4-6, & 8.

* cited by examiner

THREAD-TO-CORE MAPPING BASED ON THREAD DEADLINE, THREAD DEMAND, AND HARDWARE CHARACTERISTICS DATA COLLECTED BY A PERFORMANCE COUNTER

BACKGROUND

Chip multi-processors (CMPs) are now the dominant form of commercially available processor design. A CMP is a single chip on which are integrated multiple processor cores. The number and type of these cores on any given chip is generally limited by the die area. Processor architects have worked to develop efficient combinations of cores to integrate onto a single chip: for example, a single chip may be designed to include numerous small, simple cores, or it may be designed to accommodate a few larger, sophisticated cores. The design that is chosen can affect the processor's ability to handle threads of execution (threads), which are portions of a computer program that can run independently of and concurrently with other portions of the program. Typically, a chip with numerous small cores better accommodates computing environments characterized by higher thread parallelism, while a chip with fewer large cores is used in environments characterized by higher individual thread complexity.

A development in chip architecture is the Heterogeneous CMP. A Heterogeneous CMP is a die area on which are integrated some combination of both small, simple cores, and larger, more sophisticated cores. Thus, the cores on a Heterogeneous CMP may differ in their instruction sets; they may have various accelerators, such as Digital Signal Processing (DSP) or Streaming SIMD (SSE) extensions; their caches may vary in size; or they may have other complex design characteristics, such as branch predictors. This heterogeneous design results from many complex computing environments utilizing both high thread parallelism and high thread complexity where the requirements of distinct threads differ and individual thread may differ in its processor resource requirements over time.

BRIEF DESCRIPTION OF THE FIGURES

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

DETAILED DESCRIPTION

Figure 1:
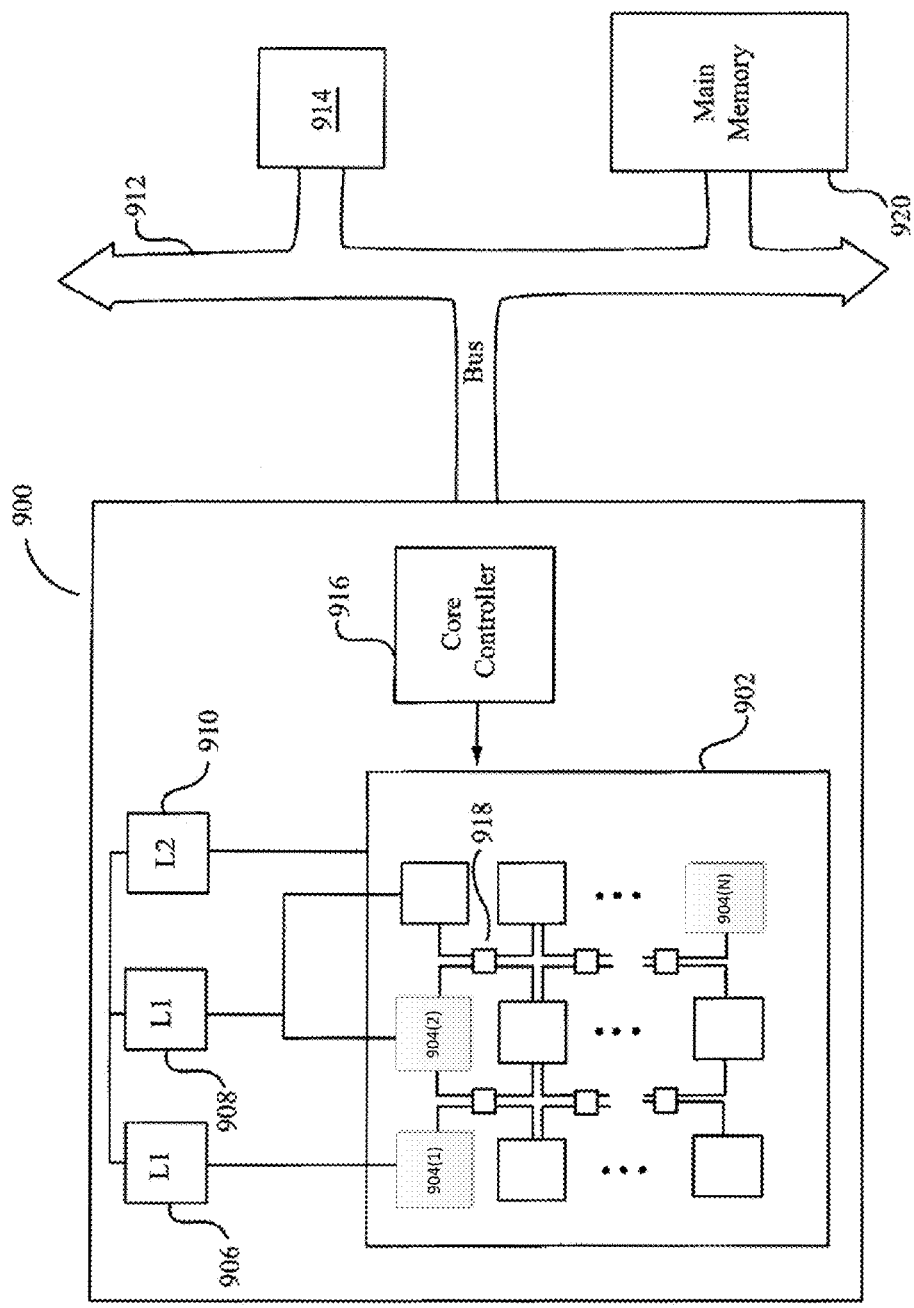
FIG. 1 is a schematic illustration of a multi-core computing system arranged in accordance with the present disclosure.

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are implicitly contemplated herein.

One utilization of a Heterogeneous CMP architecture is to dynamically associate a thread of execution with the core that, based at least in part on its hardware capabilities, is suited to that particular thread at that particular point in time. For example, a thread with a large Level-1 cache (L1) demand may be mapped to a core with large L1 hardware, while a large SSE demand may be mapped to a core having native SSE. Thus, the overall performance of the system may be improved or maximized through efficient utilization of limited hardware resources.

This disclosure is drawn, inter alia, to methods, apparatus, systems and computer program products related to thread mapping in multi-core processors. As is described herein, various examples for increasing efficiency of a Heterogeneous CMP architecture are provided. In some examples, threads of execution are mapped to processor cores, or migrated between cores, taking into consideration aspects of the Heterogeneous CMP architecture, as well as the varying thread characteristics in the computing environment over time. As a result, the performance of the whole system may be improved by effectively exploiting its diverse resources.

FIG. 1 is a schematic illustration of a multi-core processor 900 arranged in accordance with the present disclosure. The multi-core processor 900 may include a single integrated circuit having a processing core array 902. In other examples, a multi-core processor may include processors on separate integrated chips. The processing core array 902 can include some number (N) of processing cores 904(1)-904(N). Any suitable number of processing cores 904 may be provided. A processing core 904 can include logic for executing program instructions.

The multi-core processor 900 may include any combination of dedicated or shared resources. A dedicated resource may be a resource 906 dedicated to a single processing core 904, such as a dedicated level one cache, or may be a resource 908 dedicated to any subset of the processing cores 904. A shared resource may be a resource 910 shared by some or all of the cores 904, such as a shared level two cache or a shared external bus 912. Such a shared external bus 912 may support an interface between the multi-core processor 900 and another component 914. Such components 914 may include, but are not limited to, I/O devices, external sensors, or the like, or may be a resource shared by any subset of the processing cores 904. A shared resource may also include main memory 920, which may be any suitable form of memory including, but not limited to, RAM, ROM, flash storage, magnetic disk storage, tape storage, optical storage, or other machine-readable storage mediums.

As stated above, multi-core processor 900 may have any suitable number of processing cores 904. For example, multi-core processor 900 may have two (2) cores, four (4) cores, tens of cores, and even hundreds or more of processing cores. Some multi-core processors may be homogenous, such that each of the processing cores use a single core design. Other multi-core processors may be heterogeneous, such that one or more of the processing cores may be different from one or more of other processing cores, and each core or subset of cores may be designed for a different role in the multi-core processor 900.

The multi-core processor 900 may include a core controller, or core interface 916. Core controller 916 may determine which processing tasks are to be processed by individual processing cores 904. One or more switches 918 may be provided. In one example, processing tasks may be routed to selected processing cores using switches 918.

FIG. 1 is an illustrative schematic of a multi-core processor and does not illustrate physical location of the components illustrated therein. It is appreciated that the multi-core processor 900 described herein is illustrative and that examples and modifications are possible. Design choices may be driven by, for example, considerations of hardware size and complexity versus performance.

As may be appreciated by one skilled in the art, the multi-core processor 900 may be provided in a suitable computing environment, such as a personal computer. A computing environment can include the multi-core processor 900, system memory, one or more buses, and one or more I/O devices, such as a keyboard, mouse, touch screen, display device, such as a CRT or LCD based monitor, USB or other port connections, CD drives, DVD drives, and the like. Bus connections among the various components may be implemented using bus protocols such as Peripheral Component Interconnect (PCI), PCI Express, Accelerated Graphics Port (AGP), HyperTransport, or any other suitable bus protocol, and connections between different devices may use different protocols. A personal computer may operate in a networked environment using logical connections to one or more remote computers. Such remote computers may be, for example, other personal computers, servers, routers, network PCs, peer devices, or other common network nodes, and can include many or all of the elements of described above relative to multi-core processor 900. Logical connections may comprise, for example, a local-area network (LAN) or a wide-area network (WAN), intranets and the Internet.

Figure 2:
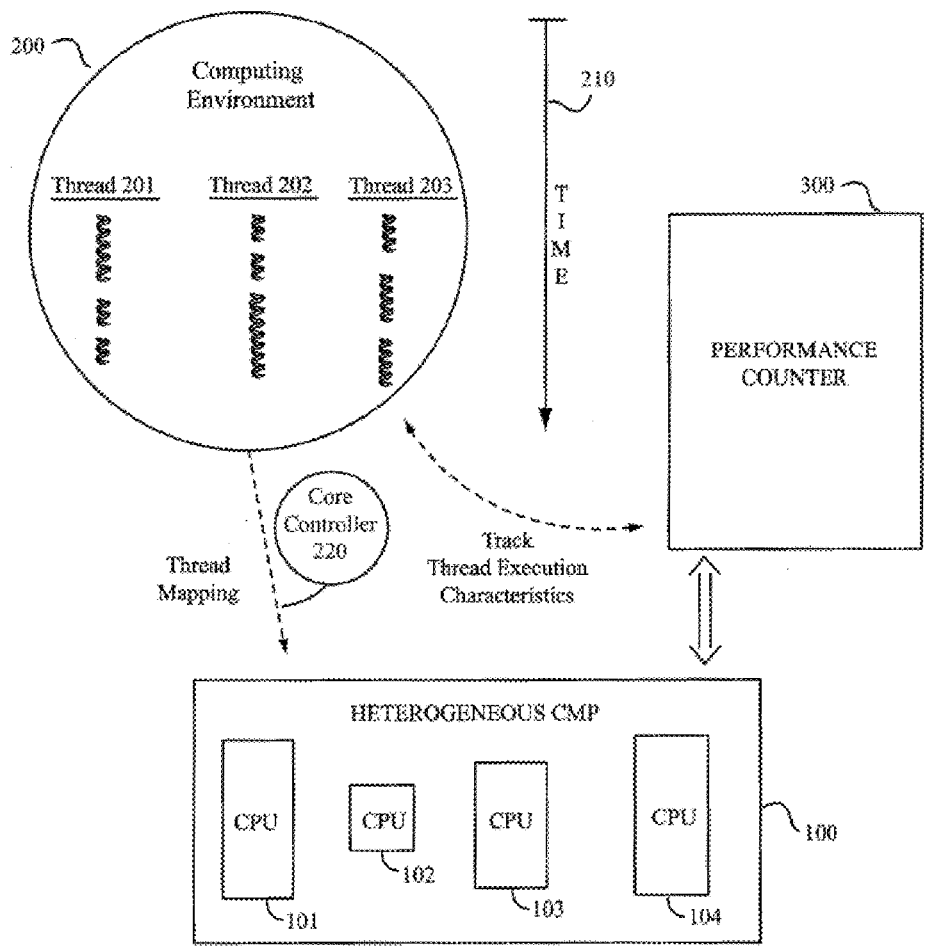
FIG. 2 is a schematic illustration of a chip multi-processor (CMP) system arranged in accordance with some examples of the present disclosure.

FIG. 2 illustrates a schematic CMP system in accordance with some examples arranged in accordance with the present disclosure. As illustrated in FIG. 2, a Heterogeneous CMP system 100 may include a plurality of processor cores, represented as CPU 101, 102, 103, and 104, that each contain hardware attributes. Such hardware attributes may include, but are not limited to, different instruction sets; accelerators, such as DSP or SSE extensions; caches of various sizes; and/or other hardware accompaniments such a branch predictors. The differing performance capabilities of individual cores are represented by the relative sizes of cores 101-104, the larger being of higher performance, and the smaller being of lower performance. It is to be appreciated that more or fewer cores may be provided, that the cores may be of uniform or varying size, and that specific descriptions of the cores herein are not intended to be limiting.

A suitable computing environment for use with the CMP system 100 is depicted in FIG. 2 by the general reference numeral 200. The computing environment 200 may include a plurality of threads of execution of different sizes and complexity, represented as threads 201, 202, and 203. The threads 201-203 are depicted within the computing environment 200 as curling lines of various lengths. As illustrated, increasing thread length represents increasing complexity. Thread characteristics within the computing environment 200 may also vary over time 210, as represented by the downward pointing arrow. For example, thread 201 may be more complex at earlier times, while less complex at later times; in contrast, thread 202 may be less complex at earlier times, while more complex at later times.

A performance counter 300 may be provided to facilitate mapping of the threads 201-203 to processor cores 101-104. A performance counter may be a special purpose register built into a chip for the purpose of storing the counts of hardware related activities. Any other suitable means for storing such data may also be used as a performance counter. In this example, the performance counter 300 may track the execution characteristics of individual threads 201-203 over time 210. Then, based at least in part on the data collected by performance counter 300, the threads 201-203 may be mapped to the processor cores 101-104 based, for example, on the hardware capabilities of individual cores. Mapping may be accomplished by a core controller 220, or any other suitable implementation. In alternative examples, other considerations may be used in mapping of the threads 201-203 to the cores 101-104. Furthermore, in some examples, if the execution characteristics of a thread change over time, after it has already been mapped to a core, the thread may be migrated to another more suitable core. Mapping of threads 201-203 to the cores 101-104 thus may be dynamic.

In another example, the data collected by performance counter 300 characterizing the executing threads 201-203 may be managed using Freeze-Dried Ghost Pages, such as described in U.S. patent application Ser. No. 11/324,174, herein incorporated by reference in its entirety. Freeze-Dried Ghost Pages are an information store configured by an execution-based improvement or optimization profile created utilizing runtime execution data.

Figure 3:
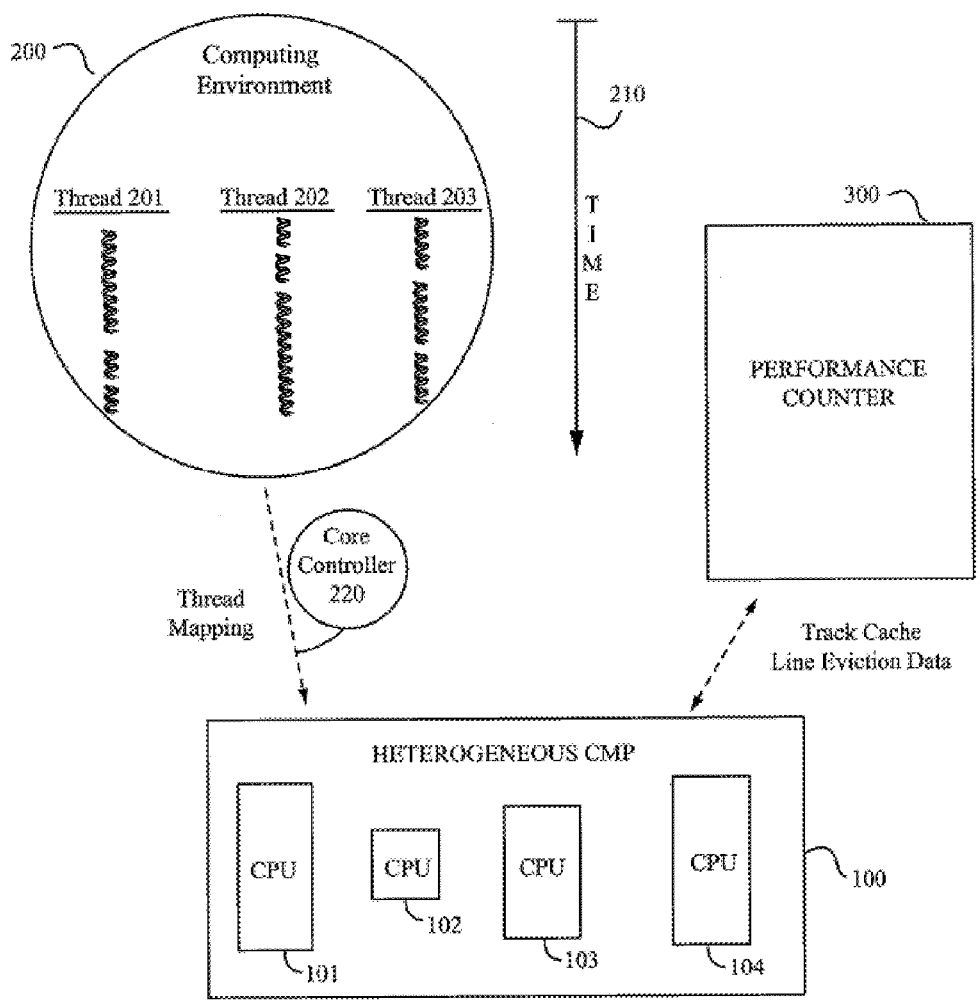
FIG. 3 is a schematic illustration of a CMP system arranged in accordance with some more examples of the present disclosure.

FIG. 3 is a schematic illustration of a CMP system arranged in accordance with some more examples of the present disclosure. As illustrated in FIG. 3, a Heterogeneous CMP system 100, a computing environment 200, and a performance counter 300 are depicted in substantially the same manner as in FIG. 2. In this figure, the Performance Counter 300 may track the cache line evictions in individual cores 101-104. A cache may refer to a temporary storage area where frequently accessed data may be stored for rapid access. A cache line eviction may occur when the computing demands on the cache exceed the cache size. Any suitable algorithm to determine which line should be evicted may be used, as would be known to one skilled in the art. In some examples, the Performance Counter 300 may use line eviction data with respect to individual running threads 201-203 to determine which task may be flushed out in order to begin another task, such as a higher priority task. Threads 201-203 may then be mapped to the cores 101-104 based at least in part on this data, or they may be migrated from one core to another. Mapping may be accomplished by a core controller 220, or any other suitable implementation.

One factor in determining which task to flush out, based at least in part on line evictions, may be the size of the cache footprint for the task. For example, a larger task having a large cache footprint may experience more line evictions before being flushed out than a smaller task having a smaller cache footprint. Accordingly, in a further example, Bloom filters may be used to characterize the size of the cache footprint. Alternatively, counting Bloom filters may be used to characterize the heat map of the cache footprint, which in turn may be correlated to the size of the cache footprint.

Figure 4:
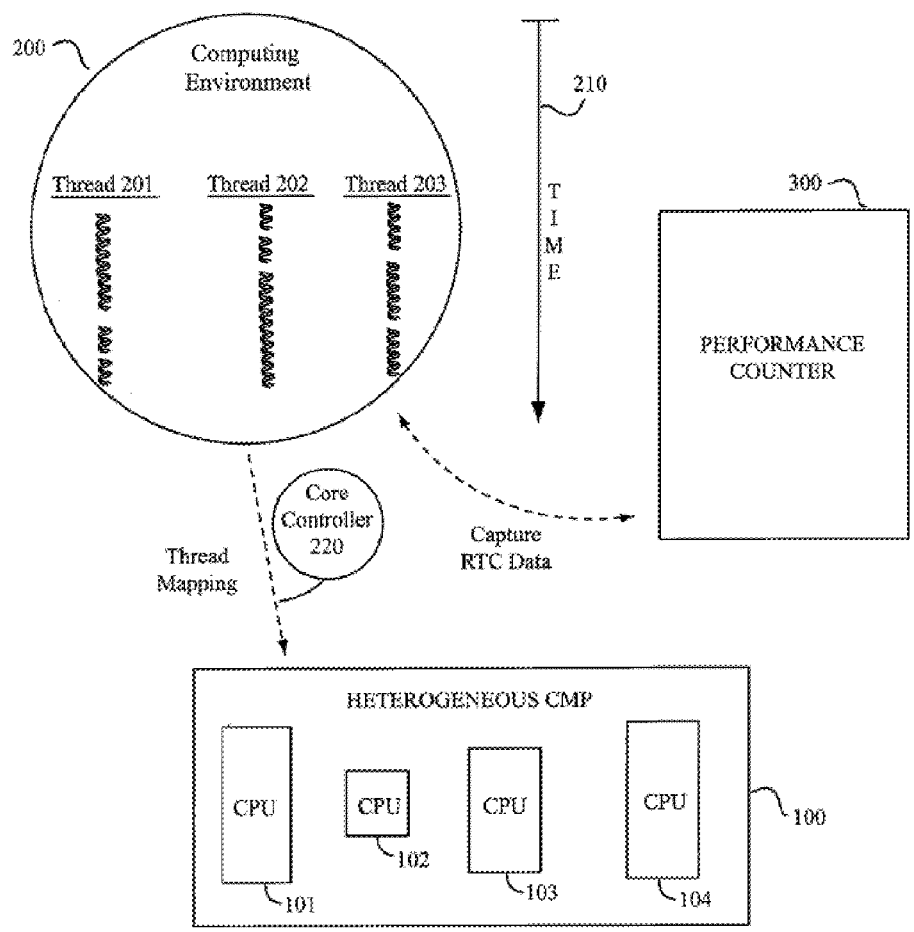
FIG. 4 is a schematic illustration of a CMP system in accordance with some additional examples of the present disclosure.

FIG. 4 is a schematic illustration of a CMP system in accordance with some additional examples of the present disclosure. As illustrated in FIG. 4, a Heterogeneous CMP system 100 and a computing environment 200 are depicted in substantially the same manner as in FIG. 2 and FIG. 3. In this example, Real-Time computing (RTC) data may be used to determine whether a thread 201-203 is falling behind its target deadline, and if so, the thread 201-203 may be migrated to a higher performance core 101-104. RTC data may relate to a Real-Time constraint, which may be the target deadline.

Figure 5A:
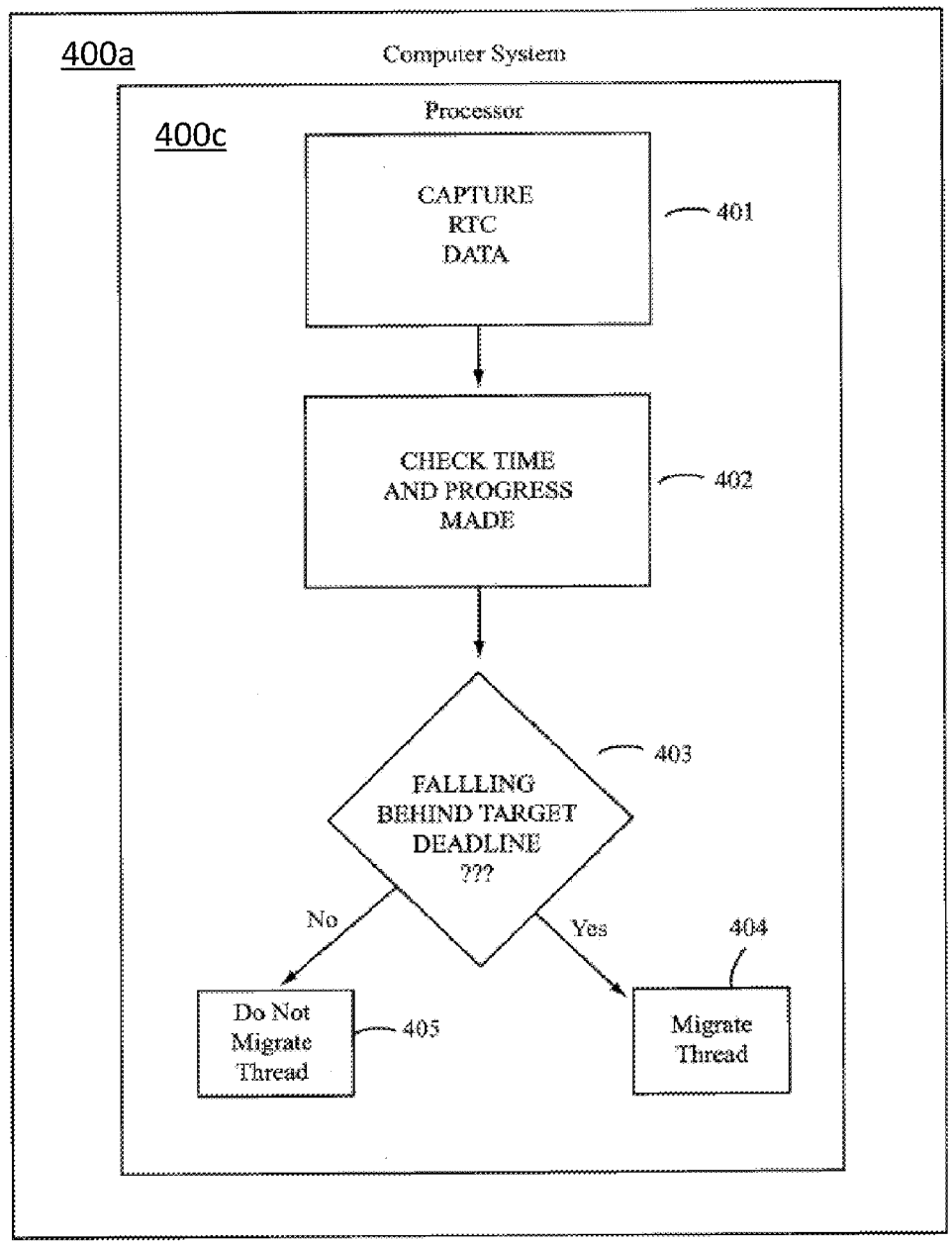
FIG. 5a is a flow diagram illustrating example methods for thread mapping in accordance with the present disclosure.

FIG. 5a is a flow diagram illustrating example methods for thread mapping in accordance with the present disclosure. As shown in FIG. 5a, a multi-core processor 400c is located within computing system 400a. RTC data may be captured by the computing system 400a [Block 401]. Next, the RTC data may be checked for the progress made in the thread execution over a given time interval [Block 402]. If the thread is falling behind its target deadline [Block 403], the thread may be migrated to a faster or higher performance core [Block 404]. If, however, the thread is on schedule, the thread may remain on the same core [Block 405]. The process depicted in FIG. 5a may be repeated to facilitate adequate thread execution progress, even if execution characteristics change over time.

Figure 5B:
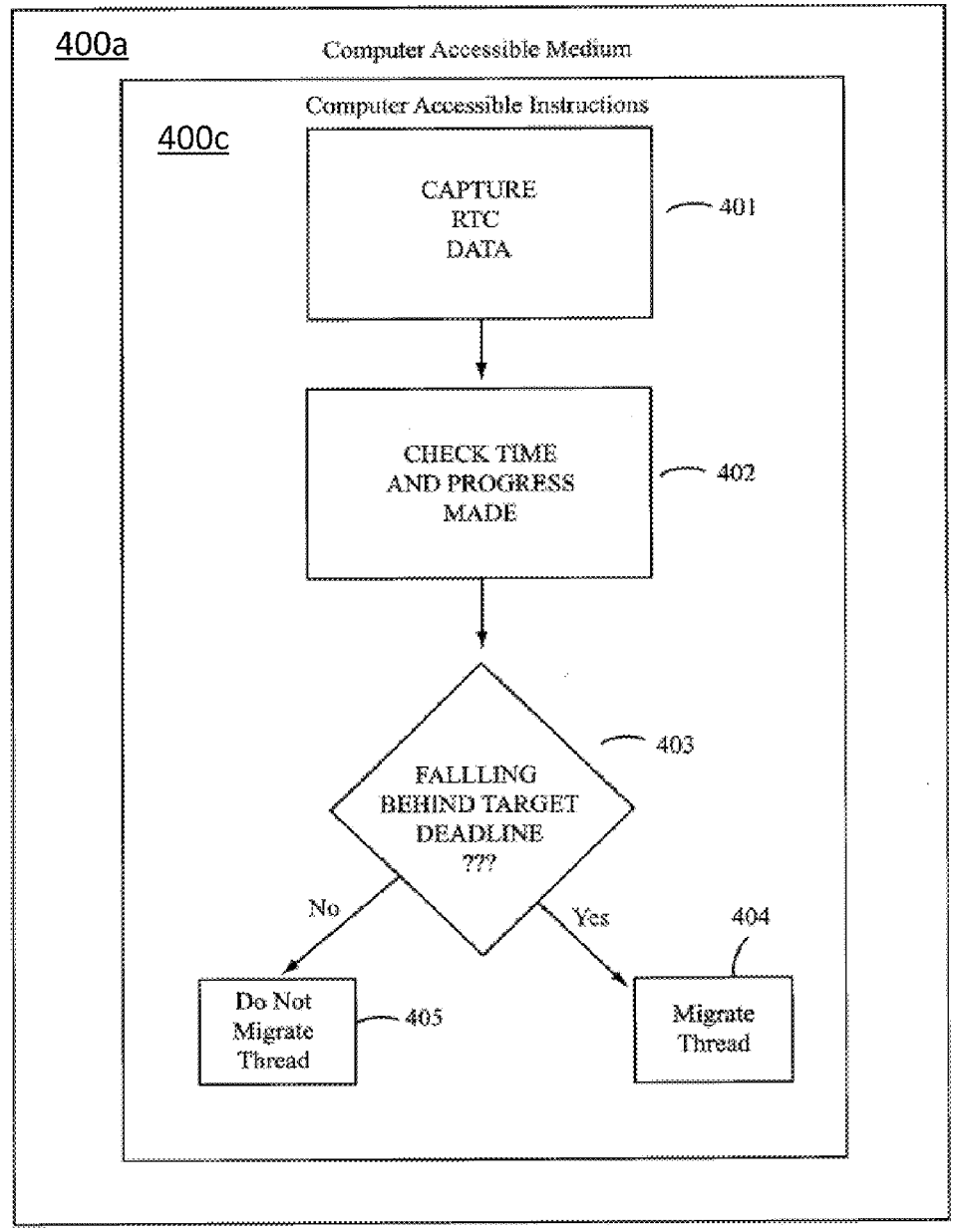
FIG. 5b is a flow diagram illustrating example computer accessible media for thread mapping in accordance with the present disclosure.

FIG. 5b is a flow diagram illustrating example computer accessible media having stored thereon computer executable instructions for performing a procedure for mapping threads of execution to processor cores in a multi-core processing system. As shown in FIG. 5b, computer accessible instructions 400c are located within computer accessible medium 400a. RTC data may be captured by the computing system 400a [Block 401]. Next, the RTC data may be checked for the progress made in the thread execution over a given time interval [Block 402]. If the thread is falling behind its target deadline [Block 403], the thread may be migrated to a faster or higher performance core [Block 404]. If, however, the thread is on schedule, the thread may remain on the same core [Block 405]. The procedures depicted in FIG. 5b may be repeated to facilitate adequate thread execution progress, even if execution characteristics change over time.

In one or more of the examples described above, if a thread is to be migrated from one core to another, the cache data for that thread may be pre-fetched. Specifically, when the system is preparing to migrate a thread to a new processor core, references from the current core may be sent to the new core to prepare for the migration. Some or all of the data relating to the thread may be pre-fetched by the new core; alternatively, only the misses, hits, or line evictions, or any combination thereof, may be pre-fetched.

Pre-fetched data may also be sent to a side/stream buffer, rather than to the new core. This alternative may prevent data that is ultimately not required from unnecessarily filling up the new core.

Figure 6A:
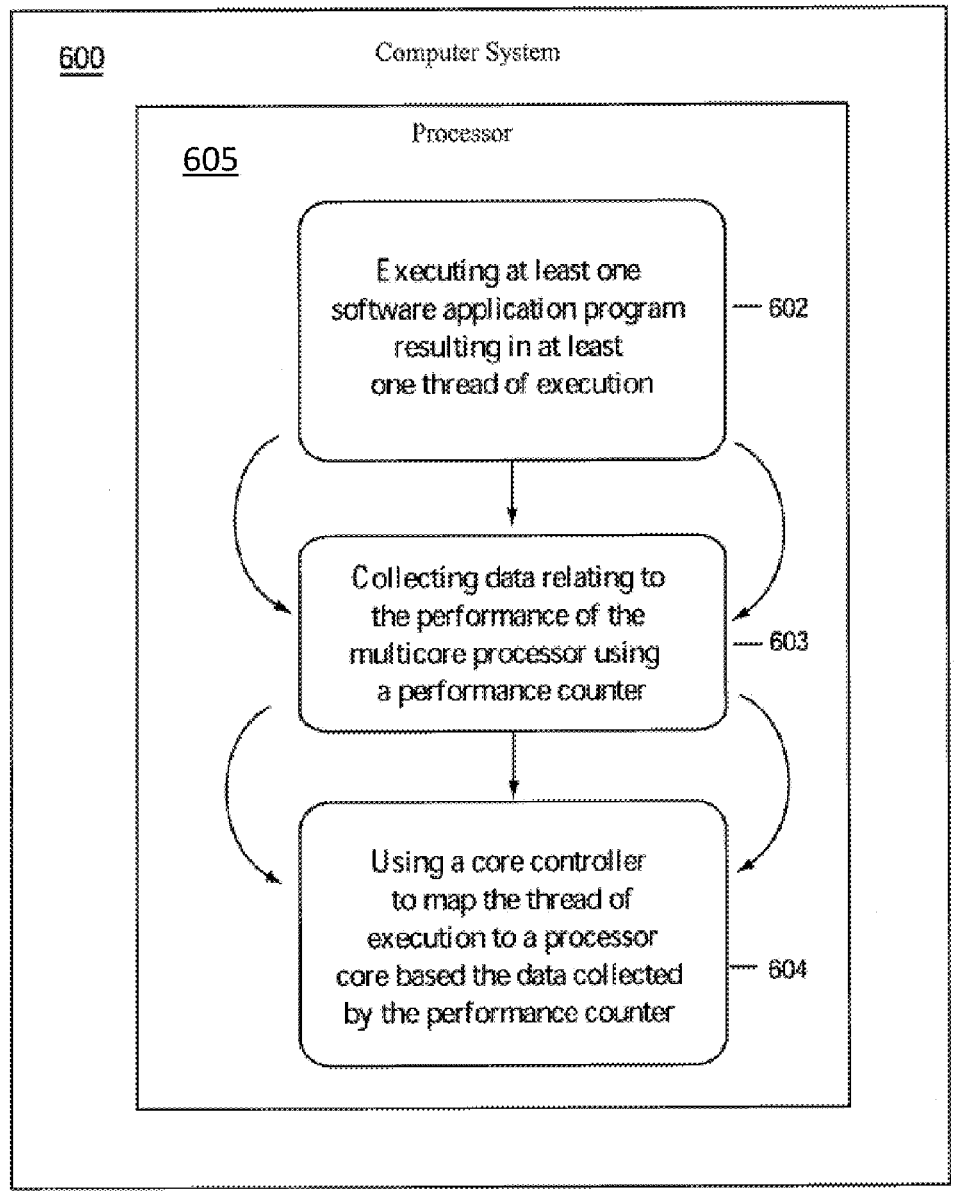
FIG. 6a is a schematic illustration of a system for performing methods for multi-core thread mapping in accordance with the present disclosure.

FIG. 6a is a schematic illustration of a system for performing methods for multi-core thread mapping in accordance with the present disclosure. As shown in FIG. 6a, a computer system 600 may include a processor 605 configured for performing an example of a method for mapping threads to execution to processor cores. In other examples, various operations or portions of various operations of the method may be performed outside of the processor 605. In operation 602, the method may include executing at least one software application program resulting in at least one thread of execution. In operation 603, the method may include collecting data relating to the performance of the multi-core processor using a performance counter. In operation 604, the method may include using a core controller to map the thread of execution to a processor core based at least in part on the data collected by the performance counter.

Figure 6B:
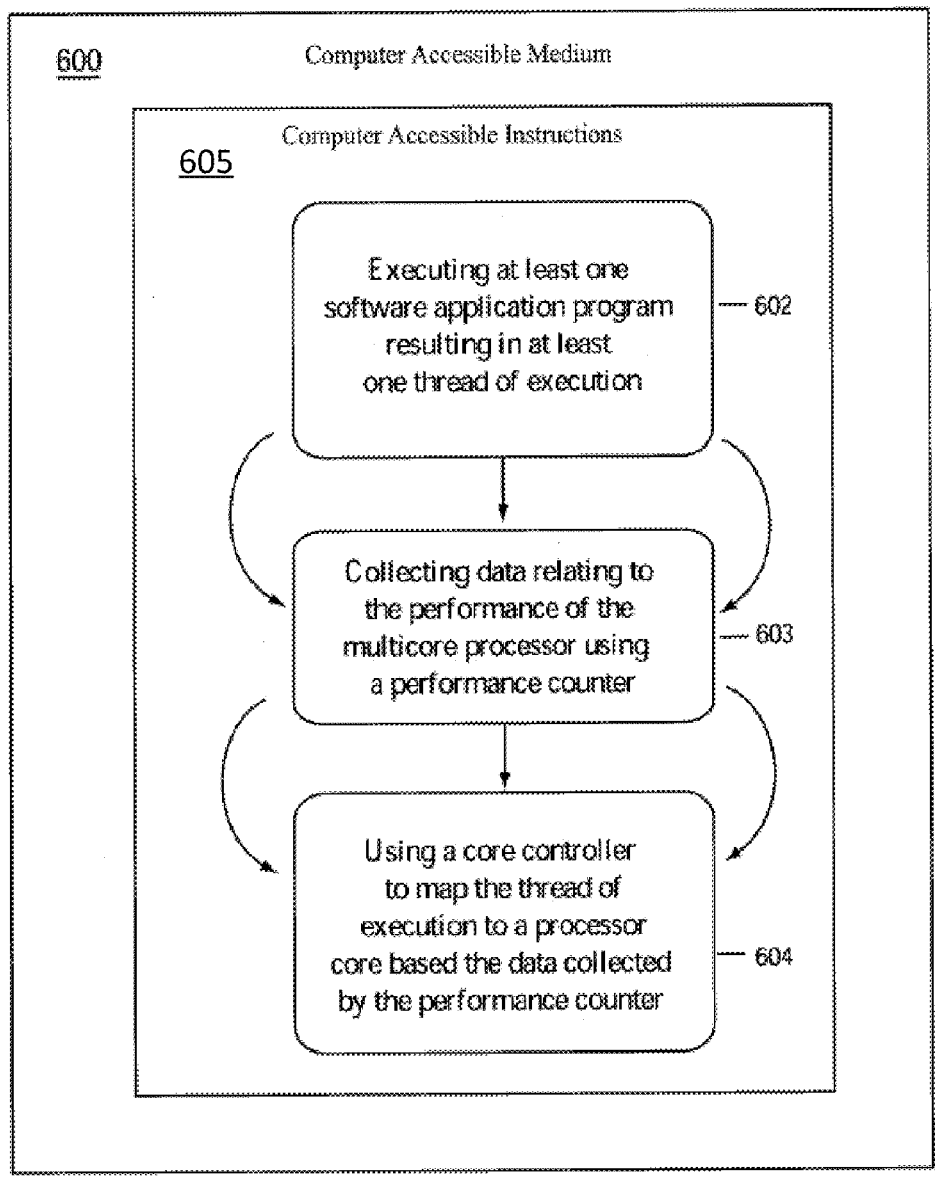
FIG. 6b is a schematic illustration of a computer accessible medium for performing actions for multi-core thread mapping in accordance with the present disclosure.

FIG. 6b is a schematic illustration of a computer accessible medium having stored thereon computer executable instructions for performing a procedure for mapping threads of execution to processor cores in a multi-core processing system. As shown in FIG. 6b, a computer accessible medium 600 may have stored thereon computer accessible instructions 605 configured for performing an example procedure for mapping threads to execution to processor cores. In operation 602, the procedure may include executing at least one software application program resulting in at least one thread of execution. In operation 603, the procedure may include collecting data relating to the performance of the multi-core processor using a performance counter. In operation 604, the procedure may include using a core controller to map the thread of execution to a processor core based at least in part on the data collected by the performance counter.

The foregoing describes various examples of thread mapping in multi-core processors. Following are specific examples of methods and systems of thread mapping in multi-core processors. These are for illustration only and are not intended to be limiting.

Disclosed in a first example is a computing system comprising a heterogeneous multi-core processor and a performance counter for the collection of data, wherein the data collected by the performance counter may be used to map threads of execution to the processor cores. In further examples, the performance counter may collect thread execution data, or it may collect cache line eviction data. In examples where thread execution data is collected, this data may be managed using Freeze Dried Ghost Pages. In examples where cache line eviction data is collected, Bloom filters, or counting bloom filters, may be used to characterize the cache footprint. In other further examples, the plurality of processor cores have differing processing capabilities. In these examples, more complex threads may be mapped to higher performance cores, and less complex threads may be mapped to lower performance cores. In still other further examples, the performance counter may be configured to collect data in real time. In any of the above examples, processor cache data may be pre-fetched, either to another core, or to a side/stream buffer.

Disclosed in a second example is a method for operating a heterogeneous multi-core processor comprising operations for executing at least one software application program resulting in at least one thread of execution, collecting data using a performance counter, and based at least in part on the data to map threads of execution to at least one processor core. In further examples, the performance counter may collect thread execution data, or it may collect cache line eviction data. In other further examples, the plurality of processor cores have differing processing capabilities. In still other further examples, the performance counter may be configured to collect data in real time. In these examples, the real-time computing data may be used to determine whether a thread is falling behind its target deadline.

Disclosed in a third example is a computer accessible medium having stored thereon computer executable instructions for performing a procedure for mapping threads of execution to processor cores in a multi-core processing system. The procedure may include collecting data relating to the performance of the multi-core processor using a performance counter; and using a core controller to map the thread of execution to a processor core based at least in part on the data collected by the performance counter.

The present disclosure is not to be limited in terms of the particular examples described in this application, which are intended as illustrations of various aspects. Many modifications and examples can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and examples are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular examples only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

What is claimed is:

1. A computing system, comprising:
a multi-core processor comprising a plurality of processor cores on a chip;
a performance counter circuit configured to collect data relating to execution characteristics of a particular thread to determine hardware capabilities of the processor cores, the performance counter circuit including a register built into the chip to store counts of hardware related activities of the processor cores; and
a core controller configured to map the particular thread to the plurality of processor cores based in part on the determined hardware capabilities of the processor cores,
wherein the processor cores are heterogeneous cores having differing processing capabilities, including at least one heterogeneous core having a streaming single instruction, multiple data (SIMD) extensions (SSE) accelerator that is different from an accelerator of another one of the heterogeneous cores,
wherein when the particular thread includes an SSE demand, which is a larger SSE demand relative to other threads, the core controller is configured to map the particular thread to the at least one heterogeneous core having the SSE accelerator,
wherein prior to a migration of the particular thread from a first core of the plurality of processor cores to a second core of the plurality of processor cores, the core controller is configured to pre-fetch cache data from a first cache associated with the first core of the plurality of processor cores, and the core controller is further configured to transfer the pre-fetched cache data to a second cache associated with the second core of the plurality of processor cores, wherein the pre-fetched cache data includes at least hits or evictions, associated with the particular thread; and wherein the core controller is further configured to determine that the particular thread is falling behind a target deadline, the determination that the particular thread is falling behind the target deadline is based on the data collected by the performance counter circuit, and the core controller is configured to map the particular thread to one of the processor cores based on the determination that the particular thread is falling behind the target deadline.

2. The computing system of claim 1, wherein the performance counter circuit is configured to collect thread execution data from one of the plurality of processor cores.

3. The computing system of claim 1, wherein the performance counter circuit is configured to collect cache line eviction data from a cache associated with one of the plurality of processor cores.

4. The computing system of claim 1, wherein the performance counter circuit is configured to collect real time computing data from a processor core.

5. A method to operate a multi-core computing system including a plurality of processor cores on a chip, the method comprising:

executing a software application program resulting in an execution of a particular thread;

collecting data relating to performance of the plurality of processor cores using a performance counter circuit, the performance counter circuit including a register built into the chip to store counts of hardware related activities of the processor cores; and determining hardware capabilities of the processor cores based on the data relating to the performance of the processor cores; and mapping, via a core controller, the particular thread to one of the plurality of processor cores based in part on the determined hardware capabilities of the processor cores, wherein the processor cores are heterogeneous cores having differing processing capabilities, including at least one heterogeneous core having a streaming single instruction, multiple data (SIMD) extensions (SSE) accelerator that is different from an accelerator of another one of the heterogeneous cores, wherein when the particular thread includes an SSE demand, which is a larger SSE demand relative to other threads, the core controller is configured to map the particular thread to the at least one heterogeneous core having the SSE accelerator, wherein prior to a migration of the particular thread from a first core of the plurality of processor cores to a second core of the plurality of processor cores, the core controller is configured to pre-fetch cache data from a first cache associated with the first core of the plurality of processor cores, and the core controller is further configured to transfer the pre-fetched cache data to a second cache associated with the second core of the plurality of processor cores, wherein the pre-fetched cache data includes at least hits or evictions, associated with the particular thread, and wherein the core controller is further configured to determine that the particular thread is falling behind a target deadline, the determination that the particular thread is falling behind the target deadline is based on the data collected by the performance counter circuit, and the core controller is configured to map the particular thread to one of the processor cores based on the determination that the particular thread is falling behind the target deadline.

6. The method of claim 5, wherein collecting data comprises collecting thread execution data associated with one of the plurality of processor cores.

7. The method of claim 5, wherein mapping the particular thread comprises mapping the data collected by the performance counter circuit to one of the plurality of processor cores.

8. The method of claim 5, wherein collecting computing data is done in real time.

9. The method of claim 5, wherein collecting data comprises collecting cache line eviction data of a cache associated with one of the plurality of processor cores.

10. A non-transitory computer accessible medium having stored thereon computer executable instructions to perform a procedure to map threads to processor cores in a multi-core processor system, the procedure comprising:

collecting data relating to performance of the multi-core processor system using a performance counter circuit, the performance counter circuit including a register built into a chip to store counts of hardware-related activities of the processor cores;

determining hardware capabilities of the processor cores based on the data relating to the performance of the multi-core processor system; and mapping, via a core controller, a particular thread to one of the processor cores based in part on the determined hardware capabilities of the processor cores, wherein the processor cores are heterogeneous cores having differing processing capabilities, including at least one heterogeneous core having a streaming single instruction, multiple data (SIMD) extensions (SSE) accelerator that is different from an accelerator of another one of the heterogeneous cores, wherein when the particular thread includes an SSE demand, which is a larger SSE demand relative to other threads, the core controller is configured to map the particular thread to the at least one heterogeneous core having the SSE accelerator, wherein prior to a migration of the particular thread from a first core of the plurality of processor cores to a second core of the plurality of processor cores, the core controller is configured to pre-fetch cache data from a first cache associated with the first core of the plurality of processor cores, and the core controller is further configured to transfer the pre-fetched cache data to a second cache associated with the second core of the plurality of processor cores, wherein the pre-fetched cache data includes at least hits or evictions, associated with the particular thread, and wherein the core controller is further configured to determine that the particular thread is falling behind a target deadline, the determination that the particular thread is falling behind the target deadline is based on the data collected by the performance counter circuit, and the core controller is configured to map the particular thread to one of the processor cores based on the determination that the particular thread is falling behind the target deadline.

11. The computer accessible medium of claim 10, wherein collecting data comprises collecting thread execution data associated with one or more of the processor cores.

* * * * *